Jan. 24, 1950     C. F. PETERSON     2,495,419
ELECTRIC HEATER
Filed Nov. 20, 1946     2 Sheets-Sheet 1
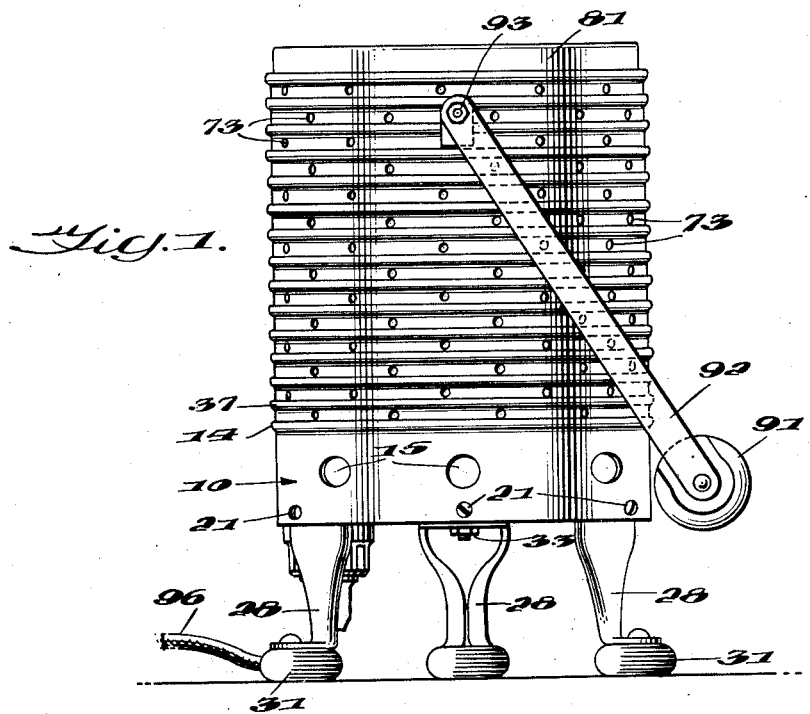
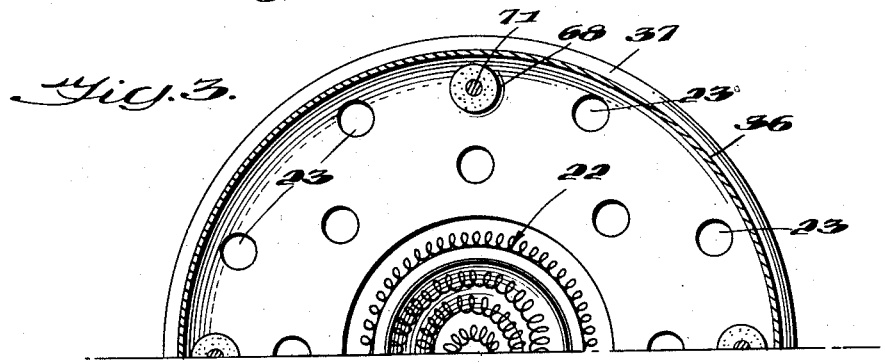
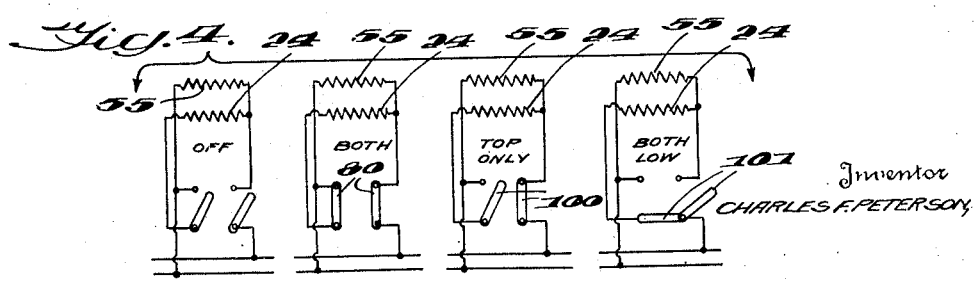
Inventor
CHARLES F. PETERSON
By Henninger and Pillars
Attorneys Jan. 24, 1950
C. F. PETERSON
2,495,419
ELECTRIC HEATER
Filed Nov. 20, 1946
2 Sheets-Sheet 2
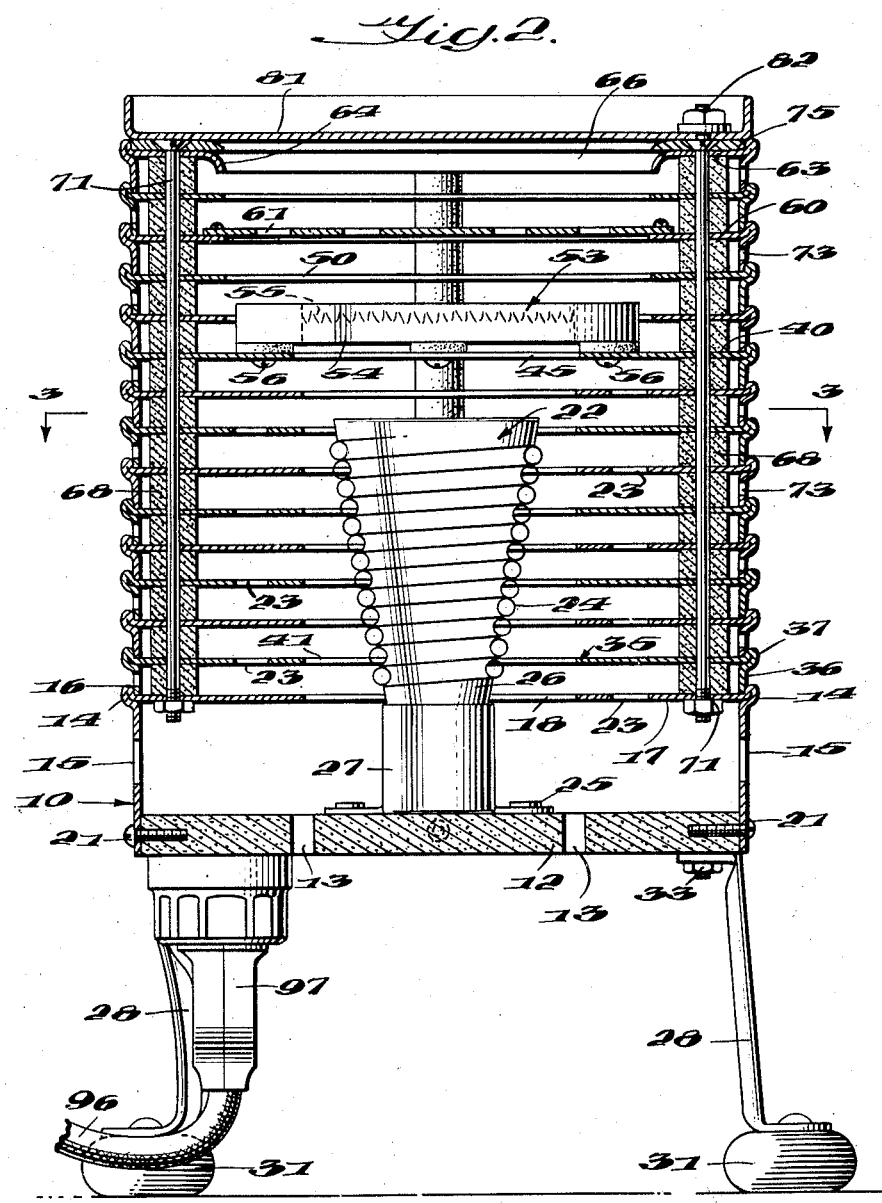
Inventor
CHARLES F. PETERSON,
By Henninger and Pillars
Attorneys Patented Jan. 24, 1950

2,495,419

UNITED STATES PATENT OFFICE 2,495,419

ELECTRIC HEATER

Charles F. Peterson, New York, N. Y.

Application November 20, 1946, Serial No. 710,998

2 Claims. (Cl. 219—19)

The present invention relates to an electrical heater and more specifically pertains to a device of this character adapted to provide a space heater and further provide means for heating articles thereon, such as cooking utensils. A more detailed feature of the invention pertains to the structure of the heat-radiating fins which form parts of the housing for the device.

It is an object of the present invention to provide an electrical heater wherein the housing is formed of a plurality of relatively short cylindrically shaped members having annular flanges extending inwardly therefrom to provide fins terminating adjacent a heating element whereby heat is conducted to the cylindrical flange portions for dissipation therefrom.

A further object of the invention pertains to the housing for an electrical heater formed of a plurality of juxtaposed elements each having a cylindrical portion and an annular fin extending inwardly from the cylindrical part so as to provide an overall cylindrically shaped housing with fins conducting the heat to the periphery of the device.

Another object of the invention is to provide a housing for an electrical heater formed of a plurality of cup-shaped units, each having an annular seat at the periphery thereof for receiving the skirt of another cup-shaped unit thereby preventing a lateral displacement of one unit relative to another and providing a rigid composite housing.

Other objects and features of the invention will be apparent as the present disclosure proceeds and upon consideration of the accompanying drawings and the following detailed description wherein an exemplary embodiment of the invention is disclosed.

In the drawings:

Fig. 1 is a side elevational view of an electrical heater embodying the invention.

Fig. 2 is a sectional view taken along the axis of the device.

Fig. 3 is a fragmentary sectional view taken on the line 3—3 of Fig. 2.

Fig. 4 is a diagrammatic view illustrating circuit connections controlling the heating elements.

The invention is directed to an electrical heater adapted to serve both as a space heater for raising the temperature of the surrounding air and for cooking purposes or heating other articles. The heater includes two heating elements, both of which may be employed as means for heating the surrounding air and one of the heating elements is adapted to serve as means for heating cooking utensils such as in brewing coffee or the like. A characteristic feature of the invention pertains to the housing structure which encases the heating elements and provides heat conducting elements which extend into the proximity of the sources of heat and thereby promotes the dissipation of heat from the outer surface of the housing. The housing or casing includes a plurality of cup-shaped units which are adapted to be assembled in juxtaposed relationship to provide a housing for the heater of any desired height, and portions of the cup-shaped units provide fins which extend from positions adjacent the heater elements to the periphery of the device and thereby facilitate the transmission of heat to the outer surface of the housing to promote more efficient dissipation of heat into the surrounding air.

Referring to the drawings, there is shown at 10 a base for the housing which is generally cylindrically shaped and is attached at its lower end to a rigid disc-shaped member 12. The disc 12 is preferably formed of an insulating material such as asbestos bonded with a suitable heat-resistant cement. The disc 12 is provided with a plurality of holes 13 spaced therearound to permit access of air to the interior of the housing hereinafter described. The base portion 10 of the housing is attached to the periphery of the disc 12 in any suitable manner such as by means of a plurality of screws 21. The wall of the housing member 10 is provided with a series of holes 15 to further facilitate the passage of air through the lower portion of the housing. The upper peripheral edge of the sheet metal forming the housing part 10 is bent outwardly as indicated at 14 and upwardly and thereafter is bent downwardly to provide a bead 16 with the inner surface thereof having a diameter substantially equal to the outer diameter of the housing portion 10. The sheet metal continues inwardly from the bead 16 to provide an annular fin or heat conducting element 17. The central portion of the fin 17 is open to provide a relatively large aperture 18. The bead 16 represents one form of an annular seat at the upper end of the housing portion 10 for receiving one of the cup-shaped units which form the housing proper.

The disc-shaped member 12 provides means for supporting one of the heater elements represented generally at 22. This heater element may be of a conventional type including a filament 24 wound helically on a frusto-conically shaped insulator and heat resistant member 26. The support 26 is adapted to be threaded into a socket member 27. This socket member is mounted on the disc 12 in the central portion thereof in any suitable manner such as by rivets 25. The heater element 22 extends upwardly through the housing and the opening 18 in the fin 17 is of sufficiently large diameter to permit the heater element to be introduced and if necessary replaced in the socket 27.

The housing member 10 and the disc-shaped plate 12 are supported by a plurality of legs 28 which are provided at their lower ends with resilient pads 31 to prevent scratching or marring of a polished surface on which the heater may be supported. The legs 28 may be attached to the disc 12 by means of bolt and nut assembly 33.

One of the cup-shaped housing units is shown at 35 in Fig. 2 and includes an inverted bottom wall having an opening 41 therein corresponding in size substantially to the area of the opening 18. The sheet metal forming the cup-shaped unit 35 is bent upwardly at its peripheral portion to provide a bead 37 surrounding the horizontal portion of the inverted cup-shaped unit. Thereafter the sheet metal extends downwardly to provide a cylindrical portion 36 or the inverted peripheral wall of the cup-shaped unit. This wall or skirt extends into the seat provided by the annular bead 16 carried by the housing portion 10. It will be observed that the annular skirt 36 is of such a diameter as to correspond substantially to the diameter of the other cup-shaped units and to the diameter of the housing member 10. Thus the cup-shaped unit 35 is prevented from shifting laterally with respect to the housing part 10 because the bead 16 and the adjacent part of the sheet metal forms a seat for receiving the lower edge of the skirt 36.

The horizontal portion of the inverted cup-shaped unit 35 thus provides a fin for transferring heat from the element 22 by conduction to the periphery of the housing unit whereby heat is dissipated from the skirt 36 which forms a part of the periphery of the housing. The cup-shaped member 35 is provided with openings 23 and the fin 17 is likewise provided with openings 23 to permit air to circulate through the heat conducting fins.

Additional cup-shaped units are arranged above the unit 35 and are similar in shape and dimensions and when arranged in the juxtaposed relationship as shown in Fig. 2 provide a composite housing for the heater elements. The cup-shaped unit 40 is provided with a central opening 45 and this unit is adapted to support a second heater element 53 thereon. This heater element is provided with a ceramic heat insulating base 54 and a filament 55. The heater element 53 is attached to the annular fin portion of the cup-shaped unit 40 by means of a plurality of screws 56. The cup-shaped units above the unit 40 are similar in shape having larger diameter openings 50 therein to permit cooking utensils or the like to be introduced into the top of the heater and into the presence of the heating element 53.

An apertured plate 61 is mounted on the inverted cup-shaped unit 60 so as to be removable therefrom and this plate 61 is adapted to support cooking utensils in the well above the heater element 53. The uppermost cup-shaped unit 63 is bent downwardly at 64 to provide an opening 66 in the top of the device and thereby provide a guiding surface for any cooking utensils or the like which are to be introduced into the top of the housing.

An annular plate 75 is arranged over the top of the assembled cup-shaped units and provides a clamping ring for a plurality of bolts 71 which extend through aligned openings in all of the cup-shaped units and through openings in the fin 17 of the housing part 10. Spacer elements 68 surround the bolts 71 between each of the cup-shaped units and the spacer elements are preferably yieldable so as to permit the skirt of each cup-shaped unit to be urged into the seat of the cup-shaped unit therebelow. These spacer elements may be formed of asbestos fibers.

The peripheral or skirt portion of each cup-shaped unit is provided with a plurality of circumferentially spaced ports 73 for the purpose of permitting air to move therethrough and in general to promote the circulation of air through the housing. The top of the device may be closed by a swingable cover 81 which is mounted to swing about a bolt 82. The cover 81 may be turned to a position to close the well or moved to a position to permit articles to be heated to be introduced into the top portion of the housing so as to be supported on the plate 61.

The device is provided with a handle 91 which includes arms 92 attached to diametrically opposite parts of the housing by means of bolt and nut assemblies 93. The handle may therefore be swung to a position illustrated in Fig. 1 or turned to a vertical position for carrying the device.

The two heating elements 24 and 55 may be deenergized by disconnecting both of these elements from the supply circuit as shown in the "off" position of Fig. 4. Current is supplied to the heating elements through a cable 96 which is provided with a detachable connection to the base plate 12 as indicated at 97. Other conductors extend through the insulating base 12 and are connected to the heater element in any suitable manner. If it is desired to employ both the filament 55 and the filament 24 for heating purposes, the switch elements may be arranged in the position as shown at 80 in Fig. 4, wherein both heaters are energized and are connected in parallel to supply a maximum amount of energy to the heating elements for dissipation therefrom. In the event that the heater element 53 and its filament 55 are to be energized, then the switch parts may be arranged in the position as shown at 100 in Fig. 4 whereby only the top heater element is energized. The heater may also be employed with both of the filaments 24 and 55 in series and the switch parts may then be arranged in the position shown at 101 in Fig. 4 whereby both heater elements are energized and in series with each other to reduce the current flowing in the heater circuit and accordingly the amount of energy which is dissipated by both of these devices.

The invention has been described with reference to specific structural details and particularly with respect to the fin and housing units. It will be appreciated that other types of annular seats may be provided on the housing units so as to prevent lateral displacement of these juxtaposed members and such changes may be made without departing from the spirit and scope of the invention as set forth in the appended claims.

I claim:

1. In an electrical heater, a cylindrical housing member, a disc formed of insulating material closing a lower end of said cylindrical housing member, an annular horizontal heat conducting fin integral with the upper end of said housing member, an electrical heater element mounted on said disc extending upwardly from a central portion thereof, said annular fin having an opening therein surrounding said heater element, an integral bead carried by the peripheral portion of the housing member at the upper end thereof, an inverted cup-shaped housing unit including a cylindrical depending skirt seated within said bead, a horizontal annular fin integral with the housing unit, said last-mentioned fin having an opening therein surrounding said electrical heater element, an annular bead carried by the periphery of the housing unit, a series of inverted cup-shaped housing units each including a cylindrical depending skirt seated within the bead of a housing unit therebelow, a disc shaped heater element supported on one of the housing units of said series above the first electrical heater element, a plurality of inverted cup-shaped housing units above the second heater element each including a cylindrical depending skirt seated within the bead of a housing unit therebelow, and integral horizontal annular fins carried by each of said plurality of housing units each having an opening therein with an area at least as great as the cross sectional dimensions of the second heater element.

2. In an electrical heater, a cylindrical housing member, a disc formed of insulating material closing a lower end of said cylindrical housing member, an annular horizontal heat conducting fin integral with the upper end of said housing member, an electrical heater element mounted on said disc extending upwardly from a central portion thereof, said annular fin having an opening therein surrounding said heater element, an integral bead carried by the peripheral portion of the housing member at the upper end thereof, an inverted cup-shaped housing unit including a cylindrical depending skirt seated within said bead, a horizontal annular fin integral with the housing unit, said last-mentioned fin having an opening therein surrounding said electrical heater element, an annular bead carried by the periphery of the housing unit, a series of inverted cup-shaped housing units each including a cylindrical depending skirt seated within the bead of a housing unit therebelow, a disc shaped heater element supported on one of the housing units of said series above the first electrical heater element, a plurality of inverted cup-shaped housing units above the second heater element each including a cylindrical depending skirt seated within the bead of a housing unit therebelow, integral horizontal annular fins carried by each of said plurality of housing units each having an opening therein with an area at least as great as the cross sectional dimensions of the second heater element, and a lid swingable in a horizontal plane to close the upper end of the top housing unit.

CHARLES F. PETERSON.

REFERENCES CITED

The following references are of record in the file of this patent:

UNITED STATES PATENTS

| Number | Name | Date |
|---|---|---|
| 1,218,206 | Panasevitch | Mar. 6, 1917 |
| 1,502,873 | Oberg | July 29, 1924 |
| 1,673,370 | Murray | June 12, 1928 |
| 1,724,198 | Hauser | Aug. 13, 1929 |
| 1,788,516 | Gannon | Jan. 13, 1931 |
| 1,823,067 | Smalley | Sept. 15, 1931 |
| 1,926,473 | Wood | Sept. 12, 1933 |
| 2,256,049 | Gallup | Sept. 16, 1941 |
| 2,276,144 | Bergstrom | Mar. 10, 1942 |